Patented Sept. 13, 1949

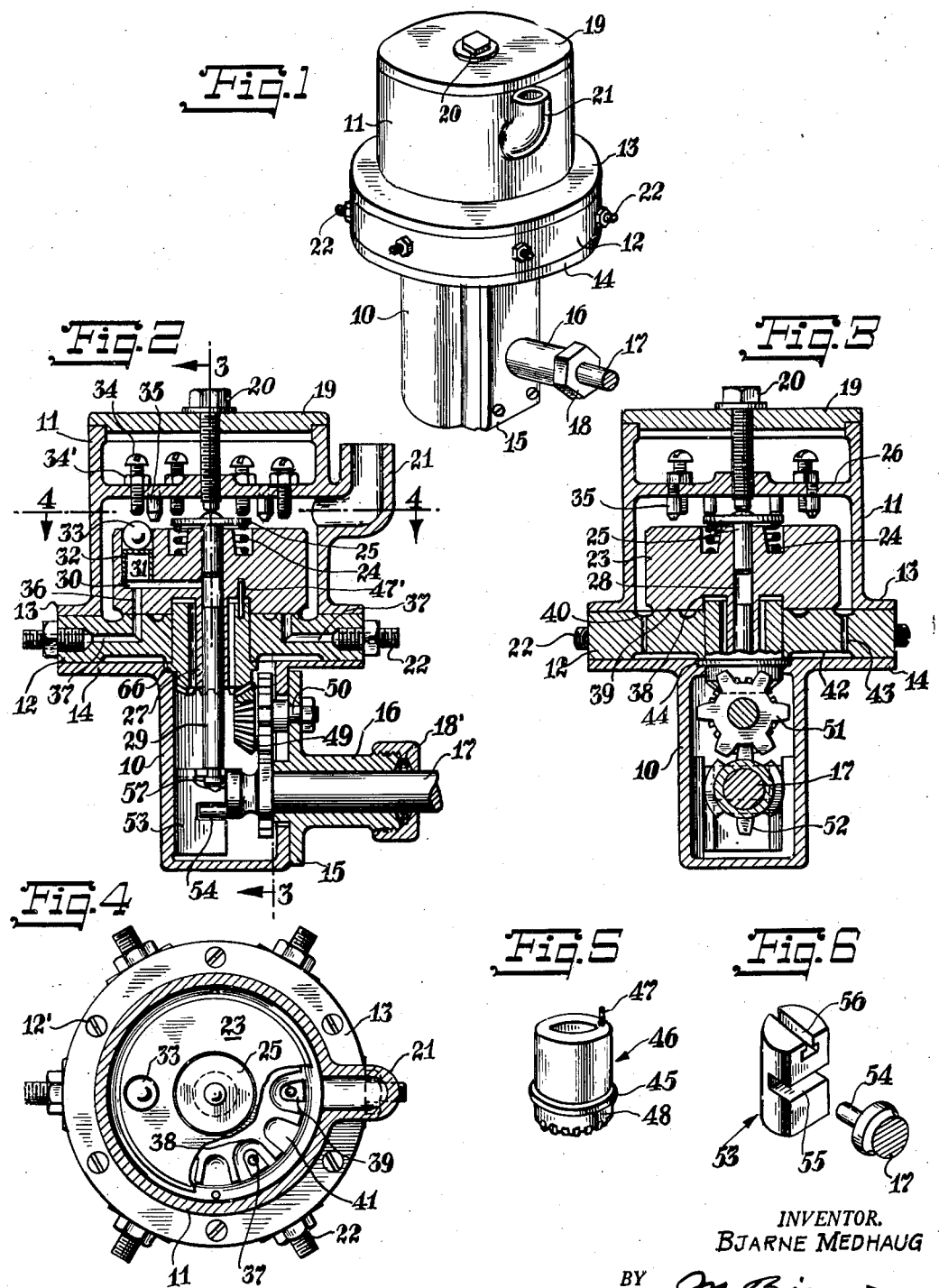

2,481,856

UNITED STATES PATENT OFFICE 2,481,856

LUBRICATOR

Bjarne Medhaug, New York, N. Y.

Application May 23, 1947, Serial No. 750,131

3 Claims. (Cl. 184—35)

The present invention relates to lubricators and, more particularly, to a lubricator of the general type disclosed in my co-pending application Ser. No. 624,557, filed October 25, 1945, now abandoned.

The lubricator referred to comprises a distributing system designed to supply lubricant, such as oil, in cyclic succession to a plurality of lubricating points, means being provided permitting individual adjustment of the amount of oil supplied to each point. In the arrangement described and shown in my above-identified earlier application these means included a piston cylinder and a sleeve having normally aligned holes, and a plurality of cam members associated with respective lubricating points for disaligning said holes to a predetermined extent, the degree of disalignment determining the amount of oil supplied.

One of the principal objects of the present invention is to provide a lubricator of even more simplified design and increased efficiency, coupled with reliable operation.

Another object of the invention is to provide a lubricator of the character described, in which the amount of lubricant supplied to the respective lubricating points may be conveniently and accurately adjusted.

The above objects, and others which will subsequently become apparent, may be accomplished in accordance with the present invention by the provision of a buffer member, displaceable during the working stroke of the pump piston under pressure from the lubricant, in combination with means for selectively limiting the travel of said buffer member; depending on the setting of the limiting means, the piston will then force a larger or smaller amount of lubricant through the appropriate conduits for effecting the desired lubrication.

According to a further feature of the invention, the buffer member will also function to insure the existence of a substantially leak-proof operative connection between associated conduits, thus resulting in a minimum of lost motion and permitting a relatively small dimensioning of the reciprocating parts.

The invention will be described in greater detail with reference to the accompanying drawing, in which:

Fig. 1 is a perspective view of a lubricator according to the invention;

Fig. 2 is an elevational cross section through the lubricator of Fig. 1;

Fig. 3 is a section taken on line 3—3 of Fig. 2;

Fig. 4 is a sectional plan view on line 4—4 of Fig. 2, with parts broken away.

Figs. 5 and 6 show in perspective view certain members of the pump mechanism.

Referring first to Fig. 1, it will be seen that the lubricator shown therein comprises a lower casing 10, an upper casing 11, and a platform 12 secured by appropriate means such as countersunk screws 12' (Fig. 4) to flanges 13, 14 integral with the two casings. The lower casing 10 is open at its side, a cover 15 being placed across the opening and being provided with a tubular projection 16 to form a bearing for a drive shaft 17. A packing gland 18 is secured to the projecting end of bearing 16 and is filled with suitable packing material 18' (Fig. 2).

The upper casing has a lid 19, secured thereto by a screw 20 in a manner yet to be described, and is further provided with an oil intake pipe 21. The platform 12 is provided with six circumferentially spaced nipples 22, as shown more clearly in Fig. 4, these nipples serving to connect the lubricator to outlet tubes (not shown) serving respective points of lubrication.

Referring now more particularly to Figs. 2, 3 and 4, it will be seen that the platform 12 supports a disc 23 which is similar to disc 37 of my aforesaid co-pending application. The disc 23 is freely rotatable on the platform 12 and is pressed thereagainst by a coiled spring 24, acting upon the head of a plunger 25 which, in turn, abuts against the lower end of screw 20. The latter is screwed into a raised central portion of a horizontal plate 26 which is integral with the upper casing 11.

The disc 23 is formed with a depending portion 27 which is traversed by the center bore 28 of the disc. Plunger 25 projects into the center bore 28 from the top while a piston 29 enters the bore from the bottom. The bore 28 communicates with a discharge duct 30 which opens into a cylindrical chamber 31, containing a vertically slidable cylinder 32. Cylinder 32 is the buffer member previously referred to. A steel ball 33 is placed atop the cylinder, and six adjusting screws 34 held in place by nuts 34' are positioned in the plate 26 so as to register with the steel ball 33, thereby limiting the upward movement of the cylinder 32. The screws 34 alternate with six fixed pegs 35, serving to insure a return of steel ball 33 to its lowermost position. The duct 30 is extended at 36 for facultative communication with passages 37 terminating in respective nipples 22, each nipple being designed as a check valve to prevent back flow of the oil into the interior of the lubricator housing.

The upper surface of platform 12, seen in Fig. 4, is formed with relatively shallow grooves 38, defining raised portions 39 which surround the entrances of respective passages 37, and with an annular depression 40 interconnecting six radial recesses 41 which alternate with the portions 39. A similar annular depression 42, of larger width, is formed on the underside of platform 12 and is connected with the depression 40 by a pair of transverse holes 43.

The lower casing 10 is formed with an annular recess 44 wherein rests a shoulder 45 of a coupling sleeve 46, shown more clearly in Fig. 5, which surrounds the portion 27 in concentrically spaced relation thereto. A pin 47 projects from the upper rim of the sleeve 46 and serves for the positive entrainment of disc 23 by engaging a hole 47' provided in the underside thereof. The lower portion of sleeve 46 is integral with or otherwise secured to a bevel gear 48, cooperating with a bevel gear 49 carried on a pin 50. Pin 50 is lodged in the cover 15 associated with casing 10. The gear 49 is integral with a pinion 51 having six teeth; this pinion 51 meshes with a cogwheel 52 which carries only two teeth, spaced 180° apart, the wheel 52 being fixed to the drive shaft 17. It will thus be seen that the disc 23 rotates intermittently as the shaft 17 is turned and, with a transmission ratio of 2:1 between gears 48 and 49, half a revolution of the shaft will advance the disc through an angle of 30 degrees.

A shoe 53, representing a fragment of a cylinder, slides up and down in the cylindrical rear portion of casing 10 under the control of the shaft 17. The wheel 52 is to this end provided with a pin 54 engaging a horizontal recess 55 in the shoe 53, see Fig. 6. A transverse slot 56, of inverted T-section, is provided in the top portion of the shoe 56 and engages the head 57 of piston 29. Thus each revolution of shaft 17 results in one reciprocation of the piston. The operation of this arrangement will now be described.

It will be observed that the oil introduced through intake 21 is able to penetrate into the lower casing 10 by way of holes 43 and groove 42; hence the rotating and reciprocating members within that casing are running in oil and no separate lubrication of the internal mechanism of the lubricator is needed. The channel system 40, 42, 43 also serves to equalize pressures during the reciprocations of piston 29. The synchronization between gears 48, 49 and members 53, 54 is such that an advance of disc 23 will take place while the piston 29 is substantially in dead center position, and that during the working (upward) stroke the outlet 36 will register with an opening 37 while, during the return stroke, outlet 36 will be over one of the recesses 41. The suction created by the latter stroke will cause oil from the casing 11 to be drawn into the chamber 28; after an advance of the disc by 30 degrees the oil will be forced out by the ascending piston through the passage 30 and, taking the path of least resistance, will first fill the chamber 31 and cause cylinder 32 to rise until the steel ball 33 strikes the end of a respective screw 34. Whatever oil still remains to be displaced by the piston 29 will then be ejected through channel 37 and nipple 22.

Thus it will be clear that it is possible, by the proper setting of screws 34, to select the amount of oil delivered by the piston 29 in each lubricating position. It should be noted that the ball 33 should never be permitted to rise more than halfway above the surface of disc 23. As the piston prepares to descend after its working stroke, the disc 23 will rotate to bring the ball 33 into contact with a peg 35 which will cam the former into its lowermost position, excess oil within chamber 31 being discharged through opening 36 registering with a corresponding recess 37.

Although the spring 24 serves to press the disc 23 against platform 12 at all times, it should be noted that, according to a further feature of the invention, there will be increased contact between the parts surrounding channels 36 and 37 whenever oil is discharged through these channels. This is due to the reactive force developed between disc 23 and cylinder 32 as the steel ball abuts against a screw 34. It is to be noted that the oil film originally existing on the surface of portion 39, surrounding a hole 37, will counteract this force and, through channel 36, will be under the same specific pressure as the oil within chamber 31. From these considerations it will appear that the cross-sectional area of chamber 31 should be larger than the surface of each raised portion 39, bounded by grooves 38 and 40, so that the hydraulic pressure developed during the upward stroke of the piston will readily displace the oil film and cause a firm adhesion between the cooperating portions of members 12 and 23.

It will be appreciated that additional features such as the visual indicators described in my aforesaid co-pending application may be incorporated in the lubricator according to the present invention, and that many modifications of the arrangement herein disclosed will be possible without departure from the spirit and scope of the invention. Thus, with a suitable change in the gearing, the lubricator may be adapted to serve any number of lubricating points, and other adaptations and modifications will readily occur to those skilled in the art.

What I claim as novel, and desire to secure by Letters Patent, is the following:

1. In a lubricator of the character described, in combination, a housing containing a lubricant, a platform forming part of said housing, said platform having a plurality of outlets, a reciprocable piston, a disc within said housing rotatable relative to said platform, said disc having a central attachment forming a cylinder for said piston, a buffer member displaceable within a chamber formed in said disc, said disc further containing a channel system communicating with said chamber and with said cylinder, a rotatable sleeve concentrically surrounding said cylinder, coupling means between said sleeve and said disc, a first gear secured to said sleeve, a second gear rotatably secured to the housing and meshing with said first gear, means for intermittently rotating said second gear, said means including a shaft projecting into the housing, a cogwheel secured to said shaft and provided with a pair of diametrically opposite teeth, and a pinion secured to said second gear and positioned for operative engagement with said teeth; means for reciprocating said piston, said means including a pin carried eccentrically on said shaft and a slidable member operatively connected with said piston and engaged by said pin, the arrangement being such that the channel system within said disc will communicate with one of said outlets during a compression stroke and with the interior of the housing during a suction stroke of the piston, and adjustable means individual to a respective outlet for selectively limiting the travel of said buffer member under pressure from the lubricant, whereby a controllable amount of lubricant will be discharged through the said outlet.

2. In a lubricator of the character described, in combination, a housing containing a lubricant, a platform forming part of said housing, said platform having a plurality of outlets, a reciprocable piston, a disc within said housing rotatable relative to said platform, said disc having a central attachment forming a cylinder for said piston, a cylindrical buffer member displaceable within a chamber formed in said disc, said chamber being open at the top toward the interior of the housing, a metal ball resting on said buffer member so as partially to project from said chamber, said disc further containing a channel system communicating with said chamber and with said cylinder, mechanism for intermittently rotating said disc whereby the channel system will alternately communicate with respective outlets and with the interior of the housing, means for reciprocating the piston in synchronism with said mechanism whereby a compression stroke will occur when the disc is at rest with the piston cylinder connected to one of said outlets, means for limiting the travel of said buffer member under pressure from the lubricant, said means including a plurality of adjusting screws each secured to the housing so as to register with said metal ball whenever said channel system communicates with a respective outlet, and means for returning said buffer member to its lowermost position, said means including a plurality of fixed members positioned for camming engagement with said metal ball whenever said channel system communicates with the interior of the housing.

3. In a lubricator of the character described, in combination, a housing containing a lubricant, a horizontal platform forming part of said housing, said platform having a plurality of outlets, a reciprocable piston, a horizontal disc within said housing rotatable relative to said platform, said disc having a depending central portion forming a cylinder for said piston, a plunger entering the bore of said cylinder from above, means including said plunger and a coil spring surrounding said plunger for pressing said disc onto said platform, a cylindrical buffer member displaceable within a chamber formed in said disc, said chamber being open at the top toward the interior of the housing, a metal ball resting on said buffer member so as partially to project from said chamber, said disc further containing a channel system communicating with said chamber and with said cylinder, a rotatable sleeve concentrically surrounding said depending portion, a pin coupling said sleeve to said disc, a first bevel gear secured to said sleeve, a second bevel gear rotatably secured to the housing and meshing with said first gear, means for intermittently rotating said second gear, said means including a shaft projecting into the housing, a cogwheel secured to said shaft and provided with a pair of diametrically opposite teeth, and a pinion secured to said second gear and positioned for operative engagement with said teeth, means for reciprocating said piston, said means including a pin carried eccentrically on said shaft and a slidable member operatively connected with said piston and engaged by said eccentric pin, the arrangement being such that the channel system within said disc will communicate with one of said outlets during a compression stroke and with the interior of the housing during a suction stroke of the piston, means for limiting the travel of said buffer member under pressure from the lubricant, said means including a plurality of adjusting screws each secured to the housing so as to register with said metal ball whenever said channel system communicates with a respective outlet, means for returning said buffer member to its lowermost position, said means including a plurality of fixed pegs positioned for camming engagement with said metal ball whenever said channel system communicates with the interior of the housing, and means for preventing the return of lubricant into the housing through the said outlet.

BJARNE MEDHAUG.

REFERENCES CITED

The following references are of record in the file of this patent:

UNITED STATES PATENTS

| Number | Name | Date |
| --- | --- | --- |
| 1,738,735 | Scoville | Dec. 10, 1929 |
| 2,157,970 | Rowland | May 9, 1939 |
| 2,192,974 | Jakobsen | Mar. 12, 1940 |
| 2,420,970 | Parker | May 20, 1947 |